United States Patent

Soliman

[11] Patent Number: 5,859,838
[45] Date of Patent: Jan. 12, 1999

[54] LOAD MONITORING AND MANAGEMENT IN A CDMA WIRELESS COMMUNICATION SYSTEM

[75] Inventor: Samir S. Soliman, San Diego, Calif.

[73] Assignee: Qualcomm Incorporated, San Diego, Calif.

[21] Appl. No.: 688,453

[22] Filed: Jul. 30, 1996

[51] Int. Cl.$^6$ .................................................. G08C 15/00
[52] U.S. Cl. ........................ 370/249; 370/342; 375/200; 375/224; 455/67.4; 455/70
[58] Field of Search .................................. 370/229, 232, 370/233, 234, 241, 249, 252, 310, 311, 313, 328, 329, 332, 335, 342; 455/67.1, 67.4, 69, 70, 115, 126, 522, 453; 379/29, 33; 375/224, 200

[56] References Cited

U.S. PATENT DOCUMENTS

| | | | |
|---|---|---|---|
| 4,670,899 | 6/1987 | Brody et al. ............................. | 455/453 |
| 5,224,120 | 6/1993 | Schilling ................................. | 375/200 |
| 5,241,686 | 8/1993 | Charbonnier ........................... | 455/453 |
| 5,361,402 | 11/1994 | Grube et al. ........................... | 455/67.1 |
| 5,367,533 | 11/1994 | Schilling ................................. | 375/1 |
| 5,451,839 | 9/1995 | Rappaport et al. .................... | 375/224 |
| 5,454,026 | 9/1995 | Tanaka ................................... | 455/453 |
| 5,465,086 | 11/1995 | Gleeson et al. ........................ | 455/67.1 |
| 5,542,120 | 7/1996 | Smith et al. ............................ | 455/67.1 |
| 5,574,984 | 11/1996 | Reed et al. ............................. | 455/67.1 |
| 5,590,409 | 12/1996 | Sawahashi et al. .................... | 455/67.1 |
| 5,603,095 | 2/1997 | Uola ....................................... | 455/67.1 |
| 5,627,834 | 5/1997 | Han et al. ............................... | 370/241 |
| 5,666,356 | 9/1997 | Fleming et al. ........................ | 370/332 |
| 5,671,218 | 9/1997 | I et al. ................................... | 370/332 |

OTHER PUBLICATIONS

S.M. Shin et al, "DS–CDMA reverse link channel assignment based on interference measurements", *Electronics Letters*, vol. 31, No. 22, Oct. 26, 1995, pp. 1897–1899.

*Primary Examiner*—Douglas W. Olms
*Assistant Examiner*—Seema S. Rao
*Attorney, Agent, or Firm*—Russell B. Miller; Bruce W. Greenhaus; Charles D. Brown

[57] ABSTRACT

A system and method for monitoring and managing the loading conditions in a CDMA wireless communication system. The system comprises a load monitoring device such as a CDMA mobile station connected to a data logging and processing device such as a diagnostic monitor. The monitoring device is placed within the service area of a base station. The monitoring device periodically initiates a call, is assigned to a traffic channel normally, and logs a power control parameter such as mobile station transmit power or the number of closed-loop power control commands received per unit time. From this information, the load monitoring device can infer the real-time traffic loading conditions of the base station. If the loading of the system exceeds a predetermined threshold, an alarm may be sent to the system management center in order to take some action to limit additional loading on the base station.

9 Claims, 2 Drawing Sheets

LOAD MONITORING AND MANAGEMENT IN A CDMA WIRELESS COMMUNICATION SYSTEM

BACKGROUND OF THE INVENTION

I. Field of the Invention

The present invention relates generally to wireless communications. More particularly, the present invention is directed to a novel and improved system and method for the monitoring and management of the loading of a Code Division Multiple Access (CDMA) wireless communication system.

II. Description of the Related Art

In the field of Code Division Multiple Access (CDMA) wireless communication, a wideband frequency channel is shared by multiple communication devices, with each communication device employing a different pseudo-noise (PN) spreading code. In a typical CDMA wireless communication system, a first frequency band is used for forward channel communications (base station to mobile station), while a second frequency band, different from the first frequency band, is used for reverse channel communications (mobile station to base station). An example of such a system is given in U.S. Pat. No. 4,901,307 entitled "SPREAD SPECTRUM MULTIPLE ACCESS COMMUNICATION SYSTEM USING SATELLITE OR TERRESTRIAL REPEATERS," issued Feb. 13, 1990, assigned to the assignee of the present invention, and incorporated herein by reference.

Fundamental to the concept of maximizing system capacity in a CDMA wireless communication system as described above is the process of power control. Subscriber units' output power must be controlled to guarantee enough signal strength received at the base station and to maintain good quality audio while minimizing the potential for interference. Since a CDMA wideband channel is reused in every cell, self interference caused by other users of the same cell and interference caused by users in other cells is the most limiting factor to the capacity of the system. Due to fading and other channel impairments, maximum capacity is achieved when the signal-to-noise ratio (SNR) for every user is, on the average, at the minimum point needed to support "acceptable" channel performance. Since noise spectral density is generated almost entirely by other user's interference, all signals must arrive at the CDMA receiver with the same average power. In the mobile propagation environment, this is achieved by providing dynamic power control of the mobile station transceiver. Power control guards against changes in system loading, jamming, slow and fast variations in channel conditions, and sudden improvements or degradations in the channel (shadowing).

Power control of the mobile station's transmitter consists of two elements: open loop estimation of transmit power by the mobile station, and closed loop correction of the errors in this estimate by the base station. In open loop power control, each mobile station estimates the total received power on the assigned CDMA frequency channel. Based on this measurement and a correction supplied by the base station, the mobile station's transmitted power is adjusted to match the estimated path loss, to arrive at the base station at a predetermined level. All mobile stations use the same process and arrive with equal average power at the base station. However, uncontrolled differences in the forward and reverse channels, such as opposite fading that may occur due to the frequency difference and mismatches in the mobile station's receive and transmit chains, can not be estimated by the mobile.

To reduce these residual errors, each mobile station corrects its transmit power with closed loop power control information supplied by the base station via low rate data inserted into each Forward Traffic Channel. The base station derives the correction information by monitoring the Reverse CDMA Channel quality of each mobile station, compares this measurement to a threshold, and requests either an increase or decrease depending on the result. In this manner, the base station maintains each reverse channel, and thus all reverse channels, at the minimum received power needed to provide acceptable performance. An example of a communication system employing the open loop and closed loop power control methods described above is given in U.S. Pat. No. 5,056,109 entitled "METHOD AND APPARATUS FOR CONTROLLING TRANSMISSION POWER IN A CDMA CELLULAR MOBILE TELEPHONE SYSTEM," assigned to the assignee of the present invention, and incorporated herein by reference.

In a CDMA wireless communication system as described above, a predetermined number of radio frequency resources, such as transceivers and channel modulator/demodulators (modems) are located at each base station. The number of resources allocated to a particular base station is a function of the anticipated traffic loading conditions. For example, a system in a rural area may only have one omni-directional antenna at each base station, and enough channel modems to support eight simultaneous calls. On the other hand, a base station in a dense urban area may be co-located with other base stations, each have several highly directional antennas, and enough modems to handle forty or more simultaneous calls. It is in these more dense urban areas that cell site capacity is at a premium and must be monitored and managed closely in order to provide the most efficient allocation of limited resources while maintaining acceptable quality of communications.

Sector/cell loading is the ratio of the actual number of users in the sector to the maximum theoretical number that the sector can support. This ratio is proportional to total interference measured at the receiver of the sector/cell. The maximum number of users that the sector/cell can support is a function of the aggregate signal-to-noise ratio, voice activity, and interference from other cells. The individual subscriber unit signal-to-noise ratio depends on subscriber unit speed, radio frequency propagation environment, and the number of users in the system. Interference from other cells depends on the number of users in these cells, radio frequency propagation losses and the way users are distributed. Typical calculations of the capacity assumes equal signal-to-noise ratio for all users and nominal values of voice activity and interference from other cells. However, in real systems, signal-to-noise ratio changes from user to user and frequency reuse efficiency varies from sector to sector. Hence there is a need to continuously monitor the loading of a sector or cell.

A conventional way to monitor cell site loading conditions is for a person, usually a network engineer or technician employed by a wireless communication service provider, to travel from cell to cell making loading condition readings using specially designed and expensive test equipment. The logged data is then returned to a central processing facility for postprocessing and analysis. Some significant drawbacks to this method are that the data can not be evaluated in real-time, and that significant errors are introduced due to propagation effects between the base station and the measurement equipment. Thus, this monitoring method only provides a rough estimate of cell site loading conditions, and can only be used in a time-delayed fashion to take corrective action, such as reassigning resources for the future. It does not enable the service provider to take any real-time action to improve loading conditions and their effect on system performance. Additionally, it requires a person to travel to each site serially, thus providing a discontinuous "hit or miss" estimate of the peak loading condition and consequent system performance depending on whether the visit coincided with the actual (rather than assumed) peak usage times.

Another possible way of monitoring cell site loading conditions is to access the performance data logged by the base station itself, or the base station controller. However, this requires that the scarce base station processing resources be diverted to collect and retrieve the data. Additionally, it suffers from the non-real time post-processing problems as previously mentioned. Lastly it also requires that a person visit each cell site serially to retrieve the data.

What is needed is a simple and accurate remote real-time load monitoring and management system which does not require access to the base station or base station controller logged data, and hence does not impact processor performance.

SUMMARY OF THE INVENTION

The present invention is a novel and improved system and method for monitoring and managing the loading conditions in a CDMA wireless communication system. The system and method uses forward link data collected by the mobile station to estimate the effect of loading on the system performance. Knowing the effect of loading on system performance, some measure may be taken to limit access to the system or to allocate more resources in order to prevent system performance degradation.

The system comprises a load monitoring device such as a CDMA mobile station connected to a data logging and processing device such as a diagnostic monitor, or a modified mobile station capable of performing data logging and processing functions itself. The monitoring device is placed within the service area of a base station. The monitoring device periodically initiates a call, is assigned to a traffic channel normally, and records the following data: 1) the mobile station reverse link transmit power measured at the antenna connector in dBm, 2) the mobile station received power on the forward link as measured at the antenna connector in dBm, and 3) the closed-loop power control commands received from the base station per unit of time. From this information, the load monitoring device can infer the real-time traffic loading conditions of the base station. In the preferred embodiment, the load monitoring device is hard-wired to the base station in order to avoid errors introduced by time-variation in over-the-air propagation effects.

The above information is measured during peak usage hours and during non-peak usage hours. In the preferred embodiment, the load monitoring device originates a call every thirty minutes for a two-minute call duration. During the time the device is in control of the traffic channel, it continuously measures the mobile station transmit power and averages it to obtain an average mobile station transmit power. By comparing the average transmit power measured in peak hours with that measured in non-peak hours, the load monitoring device can infer the loading effect on system performance. In alternate embodiments, the load monitoring device measures other power-related parameters such as the closed-loop power control commands, and averages them to obtain an average value of a variable named transmit gain adjust. Transmit gain adjust may then also be used to infer the loading effect on system performance.

The load monitoring device also passes this real-time data to the system resource management station where appropriate action may be taken based on the loading effect on system performance. For example, the load monitoring device can be used to automatically send an alarm or report to the system resource management center if the system performance degrades beyond a predetermined threshold. This alarm can be used to produce real-time corrective action such as denial of further access to the base station by other mobile stations, or merely to produce graphical representations of the loading effect on system performance over a daily cycle. Furthermore, the real-time data may be used to more efficiently allocate resources among base stations in a system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Analysis

Figure 1:
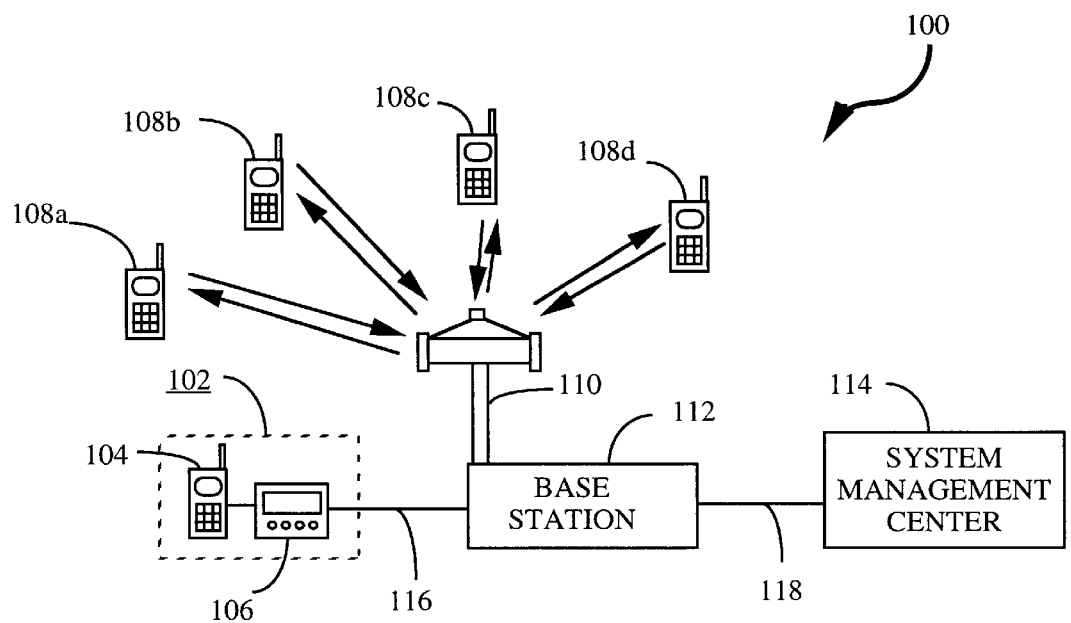
FIG. 1 illustrates a high-level overview of the system of the present invention.

The present invention relies on the behavior of the base station during various degrees of traffic loading. Specifically, as more mobile stations transmit on the common CDMA traffic channel, the less sensitive the base station becomes to any individual transmission by a mobile station, and thus the more aggressively it must perform closed-loop power control to make certain that all mobile station transmissions arrive at the base station with equal average power. Thus, if a given mobile station were stationary, and furthermore unaffected by time-variation of propagation effects (i.e. hard-wired to the base station), then the closed-loop power control commands that it would receive from the base station would be driven solely by the reverse link CDMA channel loading, and not by variations in the reverse-link power of that mobile as received at the base station (which would otherwise be constant). As such, in the present invention, the load monitoring device can infer the effect of system loading on system performance from the difference between its own transmit power and the transmit gain adjust commands from the base station.

The sensitivity, in dBm, of a base station to reverse-link transmissions by the mobile station is given by:

$$S = -134 + NF + E_B/N_O + X_L \quad (1)$$

where NF is the noise figure of the base station in dB, $E_{B/NO}$ is the ratio of the energy-per-bit of the reverse link information bits to the noise spectral density in the CDMA bandwidth in dB, and $X_L$ is the system loading in dB. In other words, $X_L$ is equal to $10[\log(1-X)]$ where X is the ratio of the number of simultaneous mobile stations on the reverse link CDMA channel to the theoretical maximum number of mobile stations that the reverse link CDMA channel can support. The sensitivity of the base station is the threshold, in dB, at which the base station can adequately receive the reverse link transmission from the mobile station. Thus, as can be seen, as the system loading $X_L$ increases, the sensitivity of the base station decreases.

The transmit power of a power-controlled mobile station is equal to the base station sensitivity, minus the reverse link path loss. That is to say that the mobile station must transmit at a power level high enough to overcome reverse link path loss, and still arrive at the base station at an acceptable level. In mathematical terms:

$$P_t^s = S + L_p^r \tag{2}$$

where $P_t^s$, is the mobile station transmit power as measured at the antenna connector in dBm, S is the sensitivity of the base station as defined in Equation (1), and $L_p^r$ is the reverse-link path loss between the mobile station antenna connector and the receive antenna connector of the base station in dB. This factor includes propagation loss, antenna gain, and feeder loss.

By substitution of Equation (1) and (2), the system loading can be written in terms of the transmit power of the mobile station as:

$$X_L = 134 - NF - E_b/N_O + P_t^s - L_p^r. \tag{3}$$

The quantities NF, $L_p^r$, and $E_b/N_O$ are constants and don't depend on the loading condition, hence Eqn. (3) can be rewritten as $$X_L = C + P_t^s \tag{4}$$

where C is a constant and $P_t^s$ is the mobile station transmit power measured at the antenna connector in dBm. Thus, by substitution of Eqn. (4) into Eqn. (3):

$$C = 134 - NF - E_b/N_o - L_p^r. \tag{5}$$

Note that $E_b/N_o$ is considered constant here since, in the preferred embodiment, the load monitoring device is hard-wired to the base station under consideration, and thus is not susceptible to time-variation caused by changing propagation effects.

Since Equation (5) holds true for all time, then the loading effect difference between two separate measurement periods can be written as:

$$X_L(t2) - X_L(t1) = P_t^s(t2) - P_t^s(t1) \tag{6}$$

where $t_2$ and $t_1$ are any two different measurement times. Thus, the unit transmit power $P_t^s$ during a non-peak usage period may be compared with that of a peak usage period to determine the effect of loading on system performance.

Viewed another way, the average transmit gain adjust may be used to determine the effect of loading on system performance. Referring back to Eqn. (3), there is also path loss on the forward link, which is equal to the forward-link power received by the mobile station, minus the forward link power transmitted by the base station. In mathematical terms:

$$L_p^f = P_r^s - P_t^b \tag{7}$$

where $L_p^f$ is the forward link path loss between the base station transmit antenna and the mobile station antenna connector in dB, $P_r^s$ is the mobile station forward link receive power measured at the antenna connector in dBm, and $P_t^b$ is the base station transmit power measured at the antenna connector in dBm. Invoking the reciprocity theorem that the average forward link path loss is equal to the average reverse link path loss, one may express the system loading in terms of the reverse link power transmitted by the mobile station, the forward link power received by the mobile station, and the forward link power transmitted by the base station, by substitution of Equations (3) and (7):

$$X_L = 134 - NF - E_b/N_o + P_t^s + P_r^s - P_t^b. \tag{8}$$

But since the mobile station uses closed-loop transmit gain adjust commands to calculate its transmit power, Equation (8) is more conveniently written as:

$$P_t^s + P_r^s - T_{adj} = k \tag{9}$$

where $T_{adj}$ is the transmit gain adjust in dB of the mobile unit in response to the closed-loop power control commands transmitted by the base station, and k is the turnaround factor that the mobile station is using to calculate the open loop transmit power. Note that even though reciprocity of the forward and reverse link path losses was assumed in Equation (7), any errors in that assumption are compensated for by the closed-loop power control commands, and thus reflected in $T_{adj}$.

By substitution of Equation (8) and (9), the base station loading may then be written in terms of the transmit gain adjust, $T_{adj}$, as follows:

$$X_L = 134 - NF - E_b/N_o + k + T_{adj} - P_t^b, \tag{10}$$

which can be conveniently re-written as:

$$X_L = C + T_{adj} \tag{11}$$

where C is a constant given by:

$$C = 134 - NF - E_b/N_o + k - P_t^b. \tag{12}$$

Since Equation (12) holds true for all time, then the loading effect difference between two separate measurement periods can be written as:

$$X_L(t_2) - X_L(t_1) = T_{adj}(t_2) - T_{adj}(t_1) \tag{13}$$

where $t_2$ and $t_1$ are any two different measurement times. Thus, the $T_{adj}$ during a non-peak usage period may be compared with that of a peak usage period to determine the effect of loading on system performance. Clearly, there are many power-related parameters that may be measured in order to compare system loading at one time with system loading at another time. For example, the above analysis may be performed to obtain a relationship of loading expressed in terms of the received power at the mobile station.

II. Load Monitoring System and Method

The relationship identified in Equation (6) or (13) above is exploited in the present invention to provide real-time monitoring and management of the system loading. FIG. 1 illustrates a high-level overview of the system 100 of the present invention. CDMA base station 112 is seen to be in wireless communication, through antenna 110, with four exemplary mobile stations 108a–108d. Mobile stations 108a–108d are, for example, power-controlled CDMA cellular radiotelephones as are known in the art. Base station 112 is also in periodic communication with load monitoring device 102, which may comprise an ordinary power-controlled CDMA cellular radiotelephone 104 coupled to a data logging and processing device 106, such as a CDMA diagnostic monitor or other data processing device as is known in the art. Alternatively, load monitoring device 102 may be a specially modified mobile station which contains a microprocessor programmed to perform the data logging and processing functions.

In the preferred embodiment, load monitoring device 102 is hard-wired to base station 112 over cables 116 in order to minimize any time-variation of both propagation effects and $E_b/N_o$ on the data recorded by load monitoring device 102. However, in alternate embodiments, load monitoring device 102 may be stationary while initiating wireless communications with base station 112 in order to log the relevant data described below.

Base station 112 is also in communication with system management center 114, wherein reside any personnel and network computers required to perform fault monitoring, diagnosis, and management of base station 112.

In FIG. 1, base station 112 passes system operating parameters and alarms to system management center 114 over cables 118. However, in alternate embodiments, base station 112 may communicate with system management center 114 using any backhaul communication method as is known in the art, such as wireless point-to-point microwave communication.

In normal operation of system 100, mobile stations 108a–108d periodically communicate with base station 112, either to originate a call, receive (terminate) a call, or to send or receive various overhead messages to or from base station 112. During peak usage hours, such as during the middle of the day, one may expect that all four mobile stations 108a–108d are in simultaneous communication with base station 112, thereby increasing system loading and interference on the reverse link. Conversely, during non-peak usage hours, such as during the middle of the night, one may expect that only one of mobile stations 108a–108d are in communication with base station 112 at any given time, thereby decreasing system loading. Note that there may be fewer or many more than four mobile stations simultaneously communicating with base station 112 depending on the capacity of base station 112. However, for purposes of simplicity, FIG. 1 is illustrated with only four mobile stations 108a–108d.

Additionally, load monitoring device 102 periodically originates a call of a predetermined length to base station 112 according to a predetermined schedule. In the preferred embodiment, load monitoring device 102 initiates a two-minute duration call to base station 112 every thirty minutes during both peak and non-peak hours. Clearly, this predetermined schedule may be varied in both duration (shorter or longer than two minutes) and frequency (shorter or longer than thirty minutes) depending on the monitoring and management needs of the system management center 114. In the preferred embodiment, a two minute call duration was chosen because it is close to the average call duration for an actual cellular radiotelephone. Additionally, the frequency of every thirty minutes may be chosen as a trade-off between data resolution and data quantity.

When any of mobile stations 108a–108d is communicating with base station 112, base station 112 transmits closed-loop power control commands to the active mobile stations 108a–108d as described in the above mentioned U.S. Pat. No. 5,056,109. Each of the closed-loop power control commands transmitted to the various active mobile stations 108a–108d directs the particular mobile station to either increase or decrease their transmit power by an amount on the order of 1 dB, in order that each mobile station's transmitted signal will arrive at the base station 112 such that signal-to-noise ratio or $E_b/N_o$ is sufficient to insure a minimum required voice quality. Additionally, whenever load monitoring device 102 is communicating with base station 112, base station 112 likewise transmits closed-loop power control commands to load monitoring device 102, because it appears the same to base station 112 as merely another mobile station.

Figure 2:
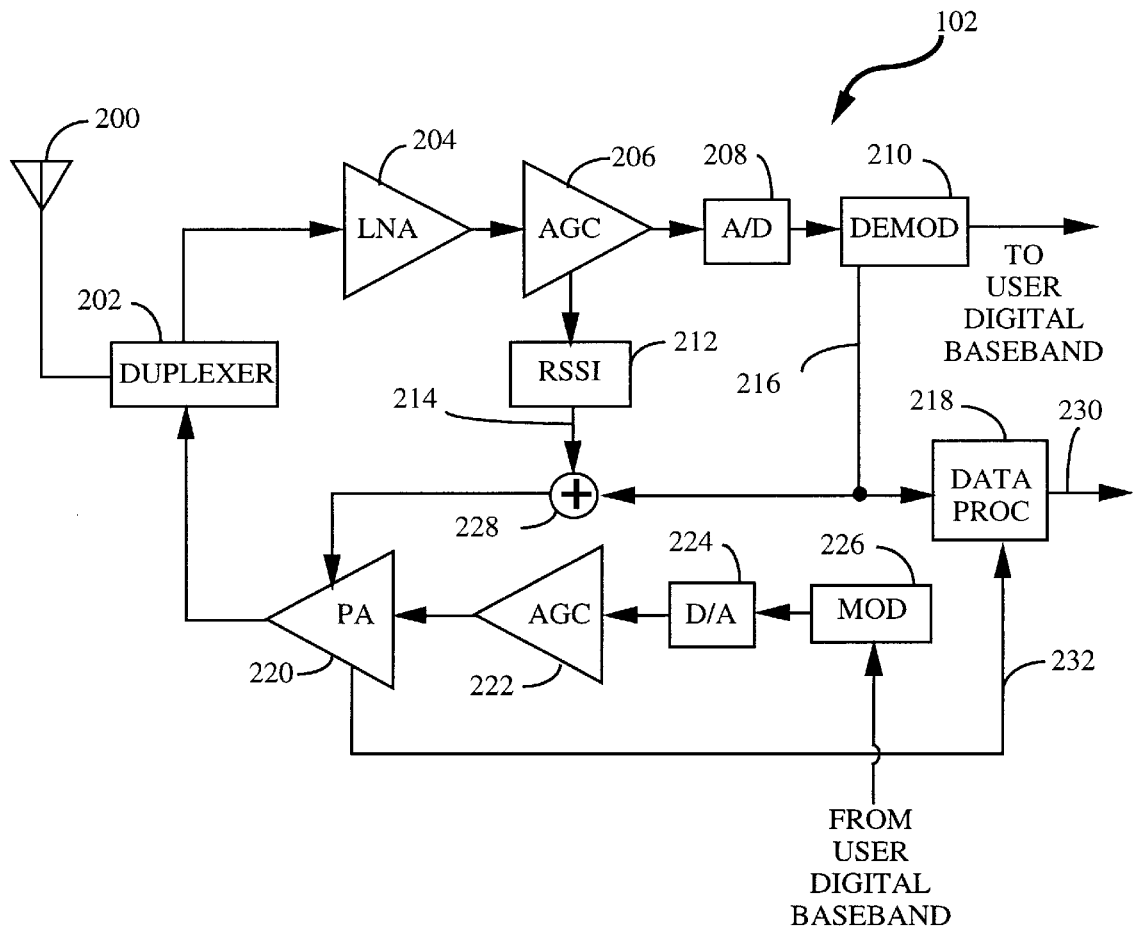
FIG. 2 is an illustration of selected portions of the load monitoring device of the present invention.

Referring now to FIG. 2, an illustration of selected portions of load monitoring device 102 is shown. Radio frequency (RF) signals including both modulated information as well as closed-loop power control commands are received by load monitoring device 102 on antenna 200. Again, note that in the preferred embodiment, signals transmitted to load monitoring device 102 by base station 112 (see FIG. 1) over cables 116 are coupled directly to an antenna port of load monitor 102. However, in alternate embodiments, the load monitoring device 102 employs a standard antenna 200 as is known in the art.

The received signals are routed by duplexer 202 to low-noise amplifier (LNA) 204 where the front-end gain is adjusted. Then, in automatic gain control amplifier (AGC) 206, the intermediate frequency (IF) power level is adjusted. The received signal strength is measured in received signal strength indicator (RSSI) 212, which uses the received signal strength to generate an open loop power control signal 214. Additionally, the received signal is sampled in analog-to-digital converter 208, and then digitally demodulated in demodulator 210. The closed loop power control commands 216 are provided to combiner 228 where they are combined with open loop power control signal 214 and used to adjust the transmit power of power amplifier (PA) 220.

In the preferred embodiment, data processor 218 logs the output power of PA 220, scaled to represent the output power as measured at the antenna 200 connector. In the preferred embodiment, data processor 218 accumulates the output power measurements over data line 232 over the two-minute call duration and averages them to obtain the average transmit power of the mobile station.

In an alternate embodiment, the closed loop power control commands 216 from base station 112 are extracted from the demodulated signal, and logged by data processor 218. In this alternate embodiment, data processor 218 accumulates the closed-loop power control commands over the two-minute call duration and averages them to obtain $T_{ADJ}$. Since the CDMA frame is 20 ms in duration, and the base station may send one closed-loop power control command per frame, $T_{ADJ}$ would be based on 6,000 individual power adjust values. Higher-order statistics may also be generated.

Data processor 218 may be an integral part of a modified mobile station, or it may be a separate data logging and processing device, such as a CDMA diagnostic monitor as is known in the art. Data processor 218 compares the average transmit power (or alternatively, the average $T_{ADJ}$ value) generated for a non-peak usage period with the average transmit power (or alternatively, the average TADJ value) generated to a peak usage period to determine the difference in system loading as derived in Equations (6) or (13). Based upon this information, data processor 218 may send an alarm or other informational signal 230, to system management center 114 (see FIG. 1) for appropriate action. Alarm or other informational signal 230 may be used to produce status reports of system loading, or to take such real-time action as to deny further access to the system if the loading exceeds a certain threshold.

Figure 3:
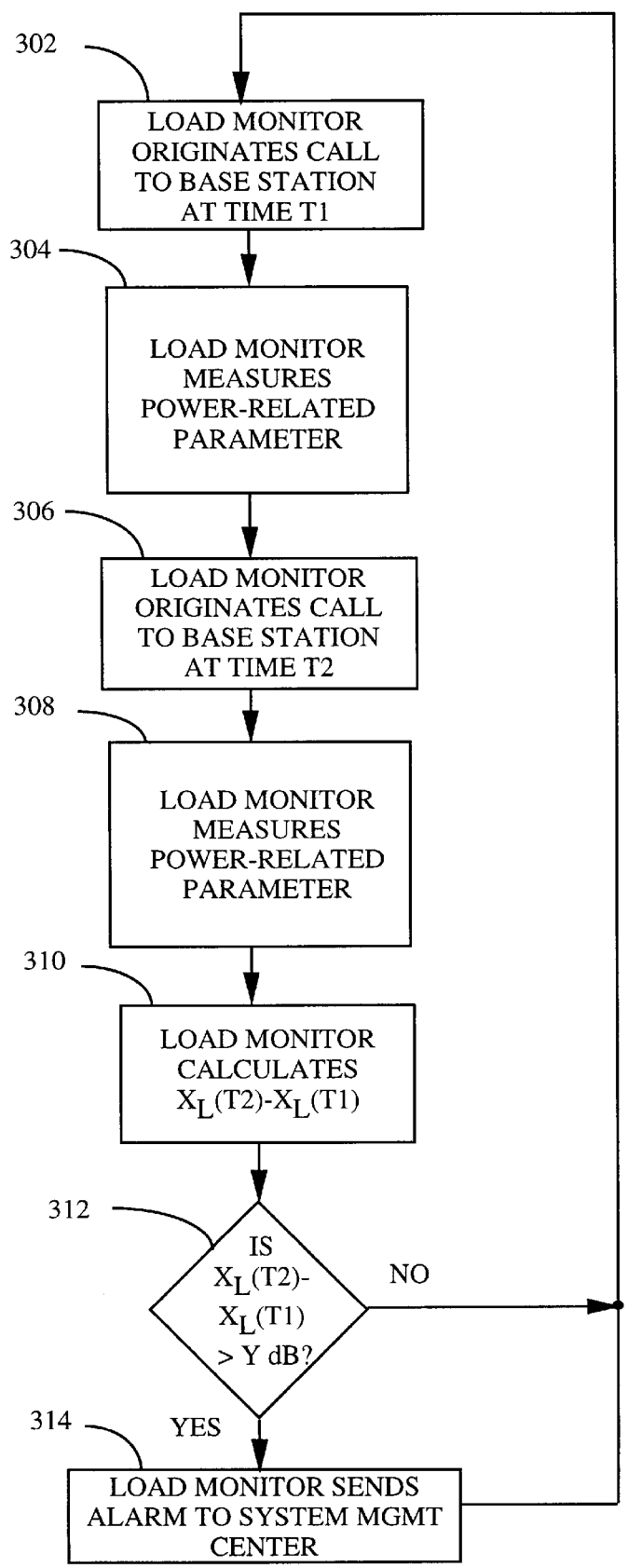
FIG. 3 illustrates the method of the present invention.

FIG. 3 illustrates the method of the present invention. The method begins in block 302 with the load monitoring device originating a call to the base station during a non-peak time T1. For the duration of the call, which in the preferred embodiment is two minutes, the load monitoring device measures a power related parameter, which may be either the mobile station transmit power in the preferred embodiment, or $T_{ADJ}(T1)$ in an alternate embodiment, in block 304. The load monitoring device then originates a call to the base station during a peak time T2 in block 306, and measures the same power related parameter for the duration of the call in block 308. In block 310, the load monitoring device then calculates $X_L(T2)-X_L(T1)$ as defined in either Equation (6) or (13), and compares it with a predetermined threshold of Y dB in block 312. The threshold, Y, may be determined individually for each base station depending on desired base station performance.

If the difference $X_L(T2)-X_L(T1)$ calculated in block 310 is greater than the predetermined threshold, Y, then the load monitoring device sends an alarm to the system management center in block 314, and appropriate actions are taken, such as denial of further access to the system. In this case, the load monitoring device would then begin the process over again in block 302. If the difference $X_L(T2)-X_L(T1)$ calculated in block 310 is less than the predetermined threshold, Y, then the load monitoring device does not send an alarm, and merely begins the process over again in block 302.

In other embodiments, modifications to the flow of FIG. 3 are made to customize the method for various applications. For example, the load monitoring device may originate several calls in blocks 302 and 306, each spaced apart by thirty minutes, during the peak and non-peak hours in order to obtain averages. Additionally, the load monitoring device may be configured to send information to the system management center regardless of whether the loading exceeded a predetermined threshold. This information could be useful, for example, to generate a graph of time versus loading for a daily operational cycle. Clearly, many adjustments to both the scheduling and use of the information may be made without departing from the spirit of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty.

Thus, the present invention is not intended to be limited to the embodiments shown herein but is to be accorded the widest scope consistent with the principles and novel features disclosed herein.

I claim:

1. A system for determining the loading on a CDMA base station which transmits closed-loop power control commands, said CDMA base station being controlled by a system management center, said system comprising:

a CDMA communication device having a transmit circuit for originating a first communication and a second communication with said CDMA base station, origination of said first communication being separated from origination of said second communication by a predetermined time interval, said CDMA communication device having a receive circuit for receiving said closed-loop power control commands;

a data processor coupled to said receive circuit for logging and for processing said closed-loop power control commands received during said first and said second communications and for generating a data signal, based on said processing, as an output of said data processor; and said data processor coupled to said system management center, said system management center processing said data signal and controlling said CDMA base station in response to said data signal.

2. The system of claim 1 wherein said data processor transmits an alarm signal to said system management center if a difference between said processed closed-loop power control commands received during said first communication and said processed closed-loop power control commands received during said second communication exceeds a predetermined threshold.

3. The system of claim 2 wherein said system management center prevents further loading of said base station in response to said alarm signal.

4. The system of claim 3 wherein said data processor is a CDMA diagnostic monitoring device.

5. A method for determining the loading on a CDMA base station which transmits closed-loop power control commands, said CDMA base station being controlled by a system management center, said method comprising the steps of:

originating a first communication with said CDMA base station;

receiving a first set of closed-loop power control commands;

logging said first set;

originating a second communication with said CDMA base station at a time separated from origination of said first communication by a predetermined time interval;

receiving a second set of closed-loop power control commands;

logging said second set;

processing said first and second sets of closed-loop power control commands to generate a data signal;

providing said data signal to said system management center; and said system management center controlling the loading of said base station in response to said data signal.

6. The method of claim 5 wherein said transmitting step further comprises transmitting an alarm signal to said system management center if a difference between said closed-loop power control commands received during said first communication and said closed-loop power control commands received during said second communication exceeds a predetermined threshold.

7. The method of claim 6 further comprising the step of preventing, from said system management center, further loading of said base station in response to said alarm signal.

8. A system for determining the loading on a CDMA base station which transmits closed-loop power control commands, said CDMA base station being controlled by a system management center, said system comprising:

a CDMA communication device having a transmit circuit for originating a first communication and a second communication with said CDMA base station, origination of said first communication being separated from origination of said second communication by a predetermined time interval, said CDMA communication device having a receive circuit for receiving said closed-loop power control commands;

a data processor coupled to said receive circuit for logging and for processing a power control parameter during said first and said second communications and for generating a data signal, based on said processing, as an output of said data processor;

said power control parameter comprising at least one of: reverse link transmit power of the CDMA communication device; received power at the CDMA communication device; and closed-loop power control commands received from the base station; and said data processor coupled to said system management center, said system management center processing said data signal and controlling said CDMA base station in response to said data signal.

9. The system according to claim 8 wherein said first communication is initiated during a peak usage hour and said second communication is initiated during a non-peak usage hour.

* * * * *